United States Patent
Stemm

(10) Patent No.: US 9,634,970 B2
(45) Date of Patent: Apr. 25, 2017

(54) APPARATUS AND METHOD FOR AUGMENTING A MESSAGE TO FACILITATE SPAM IDENTIFICATION

(71) Applicant: Cloudmark, Inc., San Francisco, CA (US)

(72) Inventor: Mark Stemm, Santa Monica, CA (US)

(73) Assignee: Cloudmark, Inc., San Francisco, CA (US)

( * ) Notice: Subject to any disclaimer, the term of this patent is extended or adjusted under 35 U.S.C. 154(b) by 265 days.

(21) Appl. No.: 13/874,376

(22) Filed: Apr. 30, 2013

(65) Prior Publication Data

US 2014/0324985 A1     Oct. 30, 2014

(51) Int. Cl.
*H04L 12/58*     (2006.01)

(52) U.S. Cl.
CPC .............. *H04L 51/12* (2013.01); *H04L 51/34* (2013.01); *H04L 51/08* (2013.01)

(58) Field of Classification Search
CPC ....... H04L 51/00; H04L 12/585; H04L 12/58; G06Q 10/107
USPC ......................................................... 709/206
See application file for complete search history.

(56) References Cited

U.S. PATENT DOCUMENTS

| | | | |
|---|---|---|---|
| 7,836,133 B2 * | 11/2010 | Quinlan et al. | 709/206 |
| 7,908,328 B1 | 3/2011 | Hulten et al. | |
| 8,090,940 B1 * | 1/2012 | Fenton | H04L 12/585 |
| | | | 709/206 |
| 8,260,914 B1 | 9/2012 | Ranjan | |
| 2002/0016824 A1 | 2/2002 | Leeds | |
| 2004/0015601 A1 | 1/2004 | Whitson | |
| 2005/0039017 A1 * | 2/2005 | Delany | H04L 9/30 |
| | | | 713/176 |
| 2005/0091320 A1 * | 4/2005 | Kirsch | H04L 51/12 |
| | | | 709/206 |
| 2005/0132060 A1 | 6/2005 | Mo et al. | |
| 2005/0198173 A1 * | 9/2005 | Evans | H04L 51/12 |
| | | | 709/206 |
| 2006/0004896 A1 * | 1/2006 | Nelson et al. | 707/206 |
| 2006/0168006 A1 | 7/2006 | Shannon et al. | |
| 2007/0011324 A1 * | 1/2007 | Mehr | G06Q 10/107 |
| | | | 709/225 |

(Continued)

FOREIGN PATENT DOCUMENTS

| | | |
|---|---|---|
| WO | 2006048621 A1 | 5/2006 |
| WO | 2010151493 A2 | 12/2010 |

OTHER PUBLICATIONS

International Search Report and Written Opinion issued to International Patent Application No. PCT/US14/35917, Sep. 25, 2014, 6 pgs.

(Continued)

*Primary Examiner* — Nicholas Taylor
*Assistant Examiner* — Chong G Kim
(74) *Attorney, Agent, or Firm* — Cooley LLP

(57) ABSTRACT

A computer includes a processor and a memory connected to the processor. The memory stores instructions executed by the processor to augment a message with network node attributes derived by linking from an original network node specified in the message to additional network nodes associated with the original network node. Message signatures representing the network node attributes are generated. The message signatures are evaluated to characterize the message.

12 Claims, 3 Drawing Sheets

(56) References Cited

U.S. PATENT DOCUMENTS

| | | |
|---|---|---|
| 2007/0027992 A1 | 2/2007 | Judge et al. |
| 2007/0204026 A1* | 8/2007 | Berger .......................... 709/223 |
| 2007/0220607 A1* | 9/2007 | Sprosts ............... G06Q 10/107 |
| | | 726/24 |
| 2008/0052364 A1* | 2/2008 | Zhou ................... G06Q 10/107 |
| | | 709/206 |
| 2009/0164598 A1* | 6/2009 | Nelson et al. ................ 709/206 |
| 2009/0307313 A1 | 12/2009 | Wang et al. |
| 2010/0332601 A1 | 12/2010 | Walter et al. |
| 2011/0113109 A1 | 5/2011 | Levasseur et al. |
| 2011/0238765 A1* | 9/2011 | Wilson et al. ................ 709/206 |
| 2011/0271349 A1* | 11/2011 | Kaplan .................. H04L 51/12 |
| | | 726/26 |
| 2011/0283357 A1* | 11/2011 | Pandrangi et al. ............. 726/22 |
| 2012/0226761 A1* | 9/2012 | Emigh et al. ................ 709/206 |

OTHER PUBLICATIONS

Oteo Mayayo, Carlota (Examiner), Extended European Search Report issued to European Patent Application No. 14791954.2, Dec. 12, 2016, 8 pages.
Stray Penguin—Linux Memo—SPAMBlock unofficial manual, Internet Archive , Aug. 10, 2011, [searched on Jan. 17, 2017], <URL: http://web_archive_org/web/20110810163743/http://www.asahi-net.or.jp/~aa4t-nngk/spamblock.html>.

* cited by examiner

APPARATUS AND METHOD FOR AUGMENTING A MESSAGE TO FACILITATE SPAM IDENTIFICATION

FIELD OF THE INVENTION

This invention relates generally to networked communications. More particularly, this invention relates to techniques for augmenting a message to facilitate spam identification.

BACKGROUND OF THE INVENTION

Unsolicited bulk electronic messages are commonly referred to as spam. Spam may be in the form of an email message, a Short Message Service (SMS) text message, a Multi-Media Service (MMS) message and the like.

There are ongoing efforts to identify and isolate spam messages because they are considered an annoyance to message recipients and they generate unwanted traffic for network operators.

SUMMARY OF THE INVENTION

A computer includes a processor and a memory connected to the processor. The memory stores instructions executed by the processor to augment a message with network node attributes derived by linking from an original network node specified in the message to additional network nodes associated with the original network node. Message signatures representing the network node attributes are generated. The message signatures are evaluated to characterize the message.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
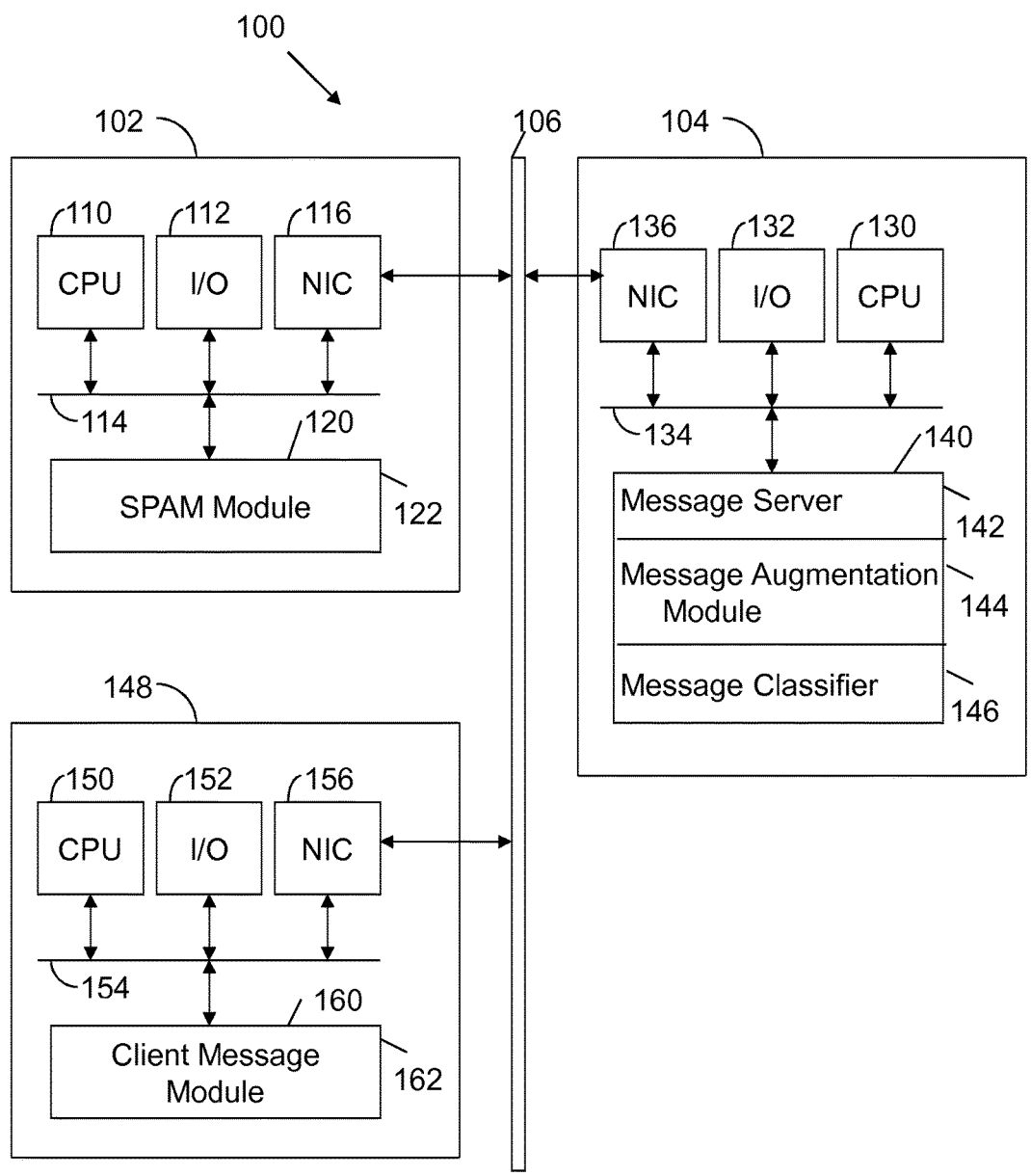
FIG. 1 illustrates a system configured in accordance with an embodiment of the invention.

FIG. 1 illustrates a system 100 configured in accordance with an embodiment of the invention. The system 100 includes a computer 102 connected to a server 104 via a network 106, which may be any wired or wireless network. The computer 102 includes standard components, such as a central processing unit 110 and input/output devices 112 linked via a bus 114. The input/output devices 112 may include a keyboard, mouse, touch display and the like. A network interface circuit 116 is also connected to the bus 114 to provide connectivity to network 106. A memory 120 is also connected to the bus 114. The memory 120 stores a spam module 122, which includes executable instructions to generate and distribute spam messages.

The server 104 also includes standard components, such as a central processing unit 130, input/output devices 134, a bus 134 and a network interface circuit 136. A memory 140 is also connected to the bus 134. The memory 140 stores executable instructions to implement operations of the invention. The modules may include a standard message server 142. The standard message server 142 has an associated message augmentation module 144, which includes executable instructions to augment a message with network node attributes, which are derived from an original network node specified in the message. The original network node may be in the message header or the body of the message.

The memory 140 also stores a message classifier 146, which includes executable instructions to generate message signatures representing features in the message and the network node attributes. The message classifier 146 evaluates the message signatures to characterize the message. For example, the message classifier 146 may compare the message signatures to message signatures known to be associated with spam. If the message signature matches are found, then the message may be deemed spam. The message may then be quarantined and the recipient may be identified about the quarantined message.

FIG. 1 also illustrates a client computer 148. The client computer 148 also includes standard components, such as a central processing unit 150, input/output devices 152 a bus 154 and a network interface circuit 156. A memory 160 is connected to bus 154. The memory 160 stores a client message module 162, which includes executable instructions to access and process messages in coordination with the message server 142.

Figure 2:
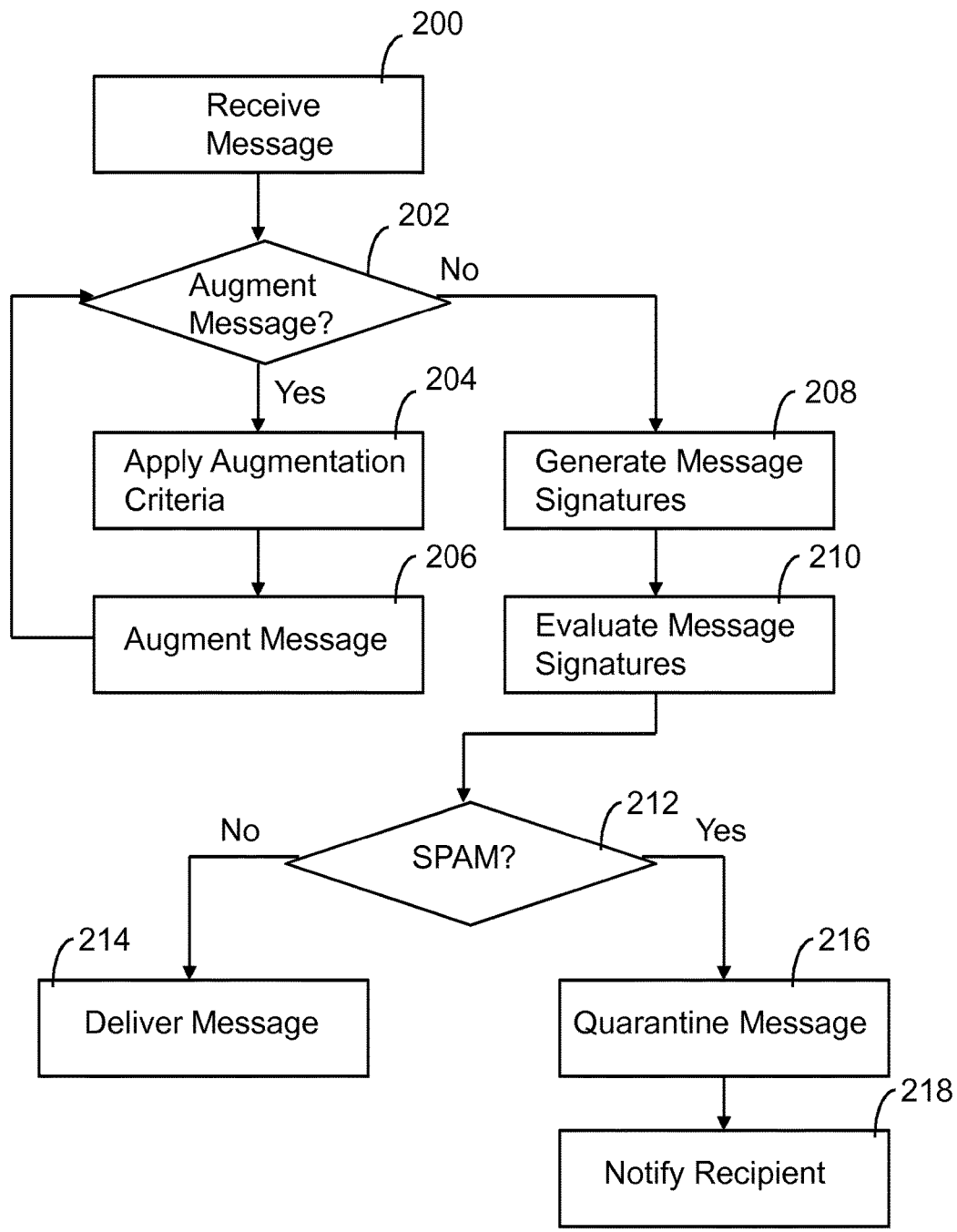
FIG. 2 illustrates processing operations associated with an embodiment of the invention.

FIG. 2 illustrates processing operations associated with an embodiment of the invention. These operations may be implemented with one or more of the message server 142, message augmentation module 144 and message classifier 146. The foregoing processing modules are exemplary. The modules may be combined or expanded. It is the operations of the invention that are significant, not the particular implementation of such operations.

Initially, a message is received 200 (e.g., by the message server 142). A message augmentation decision is then made 202 (e.g., by message augmentation module 144). If augmentation is to occur (202—yes), then augmentation criteria is applied 204 to augment the message 206. For example, original network node information, such as a network device name and a network device address may be augmented with network node attributes derived from the original network node information. The network node information may include a starting set of Internet Protocol (IP) addresses and hostnames from any location within a message. An IP address is a numerical label assigned to each device in a computer network that uses the Internet Protocol for communications. A hostname is a label assigned to a device in a computer network. The hostname may be a simple name or may be appended to a domain name. A domain name is a name in the Domain Name System (DNS). A host name has a corresponding IP address. Thus, for a given set of IP addresses and hostnames, related IP addresses and hostnames may be identified. For example, DNS lookups of hostnames and IP addresses may be used to relate a hostname to its DNS name server, relate hostnames to the IP address to which it resolves, etc.

The network node attributes may include naming system records. For example, the naming system may be selected from DNS, Network Information Service (NIS), Server Message Block (SMB), WhoIs, Web Extensible Internet Registration Data Service (WEIRDS) and Alexa®. In the case of DNS, the naming system records may be an address record, a pointer, a name server, a mail exchange and the like. Other useful DNS record types include zone information (SOA), text information (TXT, which often includes Sender Policy Framework (SPF) information and Domain Keys Indentified Mail (DKIM) information. Lookups of a base domain of a hostname may also be useful (e.g., foo.com for mail.foo.com). The resultant response records may be linked to provide features to characterize a message. For example, a tuple may be formed, which includes a query item, response record type and related item. The tuple may then be stored in a database for future reference.

After an initial augmentation of the message, control returns to block 202, where a decision is made whether to further augment the message with additional network node attributes. Thus, potential recursive linking may be invoked to find several levels of network related items. In one embodiment, dynamically updated logic can change which relationships to track between items and how far to expand the set of relationships. For example, the logic could be changed to stop performing certain DNS lookups, start performing other DNS lookups, or to stop expanding the set of relationships at a new depth.

If message augmentation is completed (202—No), then message signatures are generated for the message 208. The message signatures represent features in the message and/or the network node attributes. The message signature may be a string from the message, a hash of such a string or other segment of the message. The message signature may be based upon network node attributes or a hash thereof. Multiple signatures may be associated with a single message.

The message signatures are then evaluated 210. For example, the message signatures are compared to signatures known to be indicative of spam. That is, the generated message signatures are compared to signatures in a database of messages previously identified as spam.

If spam is not identified (212—No), then the message is delivered 214. If spam is identified (212—Yes), then the message may be quarantined 216 and a recipient may be notified 218 of the quarantined message.

The foregoing operations may be used to process the following message:

```
****************************************************
Received: from sender.com (10.2.3.4) by mta10.recipient.com
(192.168.3.5) with SMTP
From: sender@sender.com
To: recipient@recipient.com
Subject: Spam
Buy my spam at http://www.spamstore.com
****************************************************
```

In this case, the original network nodes include the following Hostnames and IP addresses:

```
sender.com
10.2.3.4
mta10.recipient.com
recipient.com
192.168.3.5
spamstore.com
```

In this example, the message augmentation module 144 performs DNS lookups to find the following relationships, additional hostnames, and IP addresses:

```
****************************************************
sender.com -> DNS A Record -> 10.2.3.4
10.2.3.4 -> DNS PTR Record -> host400.hostingcompany.com
host400.hostingcompany.com -> DNS A Record - 172.16.22.44
host400.hostingcompany.com -> DNS NS Record -
ns.hostingcompany.com
sender.com -> DNS NS Record -> ns.spammer.com
sender.com -> DNS MX Record -> mail1.spammer.com
sender.com -> DNS MX Record -> mail2.spammer.com
recipient.com -> DNS A Record -> 192.168.3.5
192.168.3.5 -> DNS PTR Record -> mta10.recipient.com
www.spamstore.com -> DNS A Record -> 172.16.22.55
www.spamstore.com -> DNS NS Record -> ns.spammer.com
****************************************************
```

The relationships are added to the message as the following headers, resulting in the following message:

```
****************************************************
    X-CM-MF: sender.com:DNS_A: 10.2.3.4
    X-CM-MF: 10.2.3.4:DNS_PTR:host400.hostingcompany.com
    X-CM-MF: host400.hostingcompany.com:DNS_A - 172.16.22.44
    X-CM-MF: host400.hostingcompany.com:DNS_NS -
    ns.hostingcompany.com
    X-CM-MF: sender.com:DNS_NS:ns.spammer.com
    X-CM-MF: sender.com:DNS_MX:mail1.spammer.com
    X-CM-MF: sender.com:DNS_MX:mail2.spammer.com
    X-CM-MF: recipient.com:DNS_A:192.168.3.5
    X-CM-MF: 192.168.3.5:DNS_PTR:mta10.recipient.com
    X-CM-MF: www.spamstore.com:DNS_A:172.16.22.55
    X-CM-MF: www.spamstore.com:DNS_NS:ns.spammer.com
    Received: from sender.com (10.2.3.4) by mta10.recipient.com
    (192.168.3.5) with
SMTP
    From: sender@sender.com
    To: recipient@recipient.com
    Subject: Spam
    Buy my spam at http://www.spamstore.com
****************************************************
```

This augmented message may then be processed by the message classifier 146. For example, the message may be deemed spam and may then be quarantined.

Another embodiment of the invention may more deeply utilize the graph of relationships between hostnames and IP addresses. The embodiment uses the relationships of the underlying graph network to define an overlay network of nodes having the same property (for example, a spam characteristic.). For example, consider the following two messages.

```
****************************************************
    Date: Mon, 28 Jan 2013 13:35:41 - 0800
    From: Spammer <buymyspam@company1.com>
    To: Recipient <recipient@recipient.com>
    Subject: Buy my amazing products
    Content-Type: text/html; charset= "utf-8"
    <a href=http://website1.com><img border=0
    src=http://website1.com>
    </a>
****************************************************
****************************************************
    Date: Mon, 28 Jan 2013 13:37:51 - 0800
    From: Spammer <buysomespam@company2.com>
    To: Recipient2 <recipient2@recipient.com>
    Subject: Today is the day to buy my products
    Content-Type: text/html; charset= "utf-8"
    <a href=http://website2.com><img border=0
    src=http://website2.com>
    </a>
****************************************************
```

Figure 3:
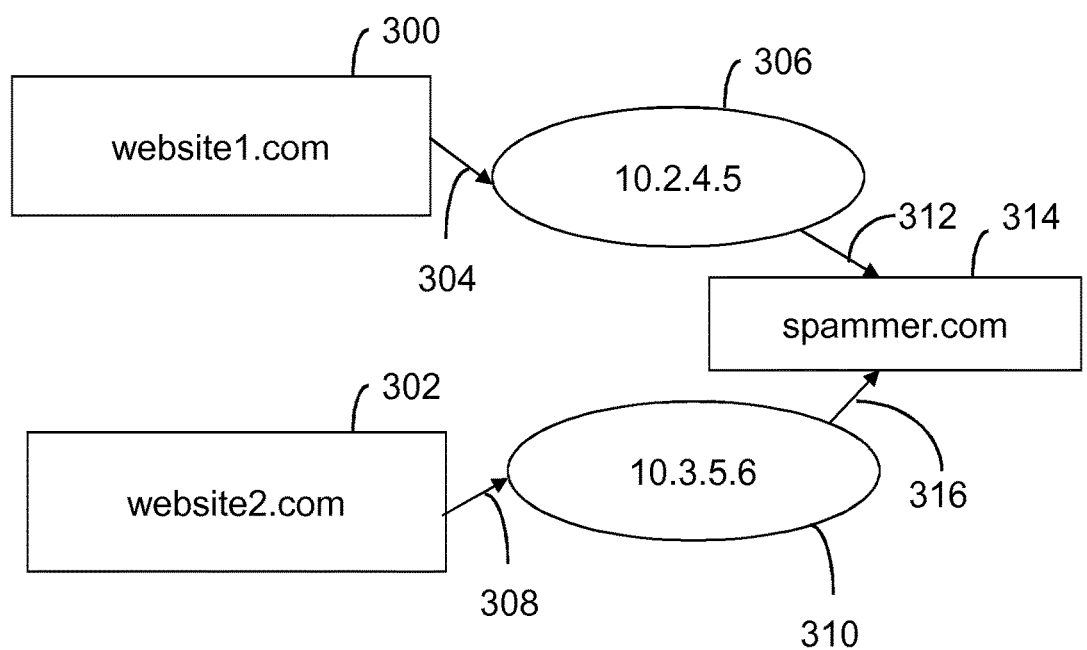
FIG. 3 illustrates a relationship graph formed in accordance with an embodiment of the invention to characterize network node attributes.

These messages may be evaluated, as shown in FIG. 3. The "website1.com" domain 300 from the body of the first message may be subject to a DNS lookup 304 to obtain IP address 306. Similarly, the "website2.com" domain 302 from the second message may be subject to a DNS lookup 308 to obtain IP address 310. The IP address 306 may subsequently be subject to a WhoIs lookup 312 to obtain the domain spammer.com 314. Similarly, the IP address 310 may be subject to a WhoIs lookup 316 to obtain the same domain name 314.

Thus, relationships between domain names and IP addresses present in a message may be used to identify related domain names and/or IP addresses that are not present in the message. These relationships can be used to impute spam characteristics to related nodes. For example, if the spammer.com domain is known to be spam, related nodes in the graph of FIG. 3 may also be characterized as spam. Such relationships may be stored in a relational database for subsequent reference.

Any number of processing techniques may be used to uncover relationships between nodes. For example, one procedure may be used to get a full set of information on a single node (domain name or IP address), another procedure may be used to get information on direct neighbor nodes, and another procedure may be used to graph all nodes reachable from a given host node.

Given a fully defined graph of relationships between nodes, algorithms can then examine this graph and spread node characteristics (such as spam categorization) given a method for identifying a root set of nodes combined with one or more inductive steps for spreading node characteristics. For example, one might define the root set of nodes as those already known to have a spam characteristic according to some external source. One inductive step may be defined as "if most of the children of this node have a given characteristic, and the children are related via a specific property, then spread the characteristic to the parent node." Another might say "if a child node has a relationship of a specific type to a parent node, then spread the characteristic to the child node." This inductive step is then reapplied with the updated set of nodes to find additional nodes. Repeatedly applying the inductive step spreads the characteristic from the initial root set throughout the graph to additional nodes, resulting in an overlay on the underlying graph of relationships.

Advantageously, the invention provides a technique for expanding the information that may be utilized to identify spam. That is, recursive linking to related hosts and IP addresses increases the opportunities to find taints associated with spam.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A computer, comprising:
a processor; and
a memory connected to the processor, the memory storing instructions executed by the processor to:
receive an electronic mail message with original network nodes specifying original host names and original Internet Protocol (IP) addresses,
perform a machine lookup to identify additional host names and additional IP addresses associated with the original host names and original IP addresses,
augment the electronic mail message with network node attributes including the additional host names and additional IP addresses, wherein the network node attributes are added to the electronic mail message in a header section,
generate message signatures representing the network node attributes, and
evaluate the message signatures to characterize the message, wherein the evaluate operation imputes unsolicited bulk electronic message (spam) characteristics to related nodes in a graph linking an original network node specified in the electronic mail message to additional network nodes associated with the original network node.

2. The computer of claim 1 wherein the original network node includes a network device indicator in the message.

3. The computer of claim 2 wherein the network device indicator is a host name.

4. The computer of claim 2 wherein the network device indicator is an Internet Protocol (IP) address.

5. The computer of claim 1 wherein the network node attributes include naming system records.

6. The computer of claim 5 wherein the naming system is selected from Domain Name System (DNS), Network Information Service (NIS), and Server Message Block (SMB).

7. The computer of claim 1 further comprising instructions executed by the processor to decide whether to further augment the message with additional network node attributes through recursive linking.

8. The computer of claim 1 further comprising instructions executed by the processor to form a quarantined message characterized as spam.

9. The computer of claim 8 further comprising instructions executed by the processor to notify a recipient of the quarantined message.

10. The computer of claim 1 further comprising instructions executed by the processor to generate message signatures representing features in the message.

11. The computer of claim 1 further comprising instructions executed by the processor to store in the message relations between network node attributes.

12. The computer of claim 11 further comprising instructions executed by the processor to evaluate the relations to identify a suspect node and ascribe a suspect characteristic to nodes related to the suspect node.

\* \* \* \* \*